United States Patent [19]
Hahm et al.

[11] Patent Number: 5,371,562
[45] Date of Patent: Dec. 6, 1994

[54] STEREOSCOPIC DISK AND VIEWER AND METHOD OF MAKING

[75] Inventors: Timothy P. Hahm; Joseph A. Mainco, both of Rochester, N.Y.

[73] Assignee: Eastman Kodak Company, Rochester, N.Y.

[21] Appl. No.: 71,153

[22] Filed: Jun. 2, 1993

[51] Int. Cl.⁵ .............................................. G03B 35/00
[52] U.S. Cl. ...................................... 354/112; 355/22
[58] Field of Search ............... 354/112, 116, 120, 121, 354/114; 359/467; 355/22, 40; 351/203

[56] References Cited

U.S. PATENT DOCUMENTS

| | | | |
|---|---|---|---|
| 3,772,465 | 11/1973 | Vlahos et al. | 355/40 |
| 4,726,653 | 2/1988 | Thaler et al. | 359/467 |
| 4,902,580 | 9/1983 | Ross | 351/203 |
| 5,136,619 | 8/1992 | Ushiro et al. | 354/114 |
| 5,276,478 | 1/1994 | Morton | 355/22 |

OTHER PUBLICATIONS

The World of 3-D-A practical guide to stereo photography by Jac. G. Ferwerda, 2nd Edition, 1987, 3-D Book Productions, The Netherlands, pp. 67, 69, 169, 171.

*Primary Examiner*—D. Rutledge
*Attorney, Agent, or Firm*—Thomas H. Close

[57] ABSTRACT

A stereoscopic disk for viewing stereo images in a binocular viewer includes a film disk with a plurality of stereo image pairs disposed around the periphery of the film disk, sandwiched between a pair of disks of opaque material defining windows, in which the stereo images on the film disk are located. A method for making the stereoscopic disks includes the steps of making a master image of the stereoscopic images arranged in a circular pattern, printing the master image onto photographic film, laminating the film with strips of opaque material having windows for the images on the disk, and punching out the finished disk from the laminated assembly. A simple stereo viewer employs the film disks without the laminations.

18 Claims, 8 Drawing Sheets

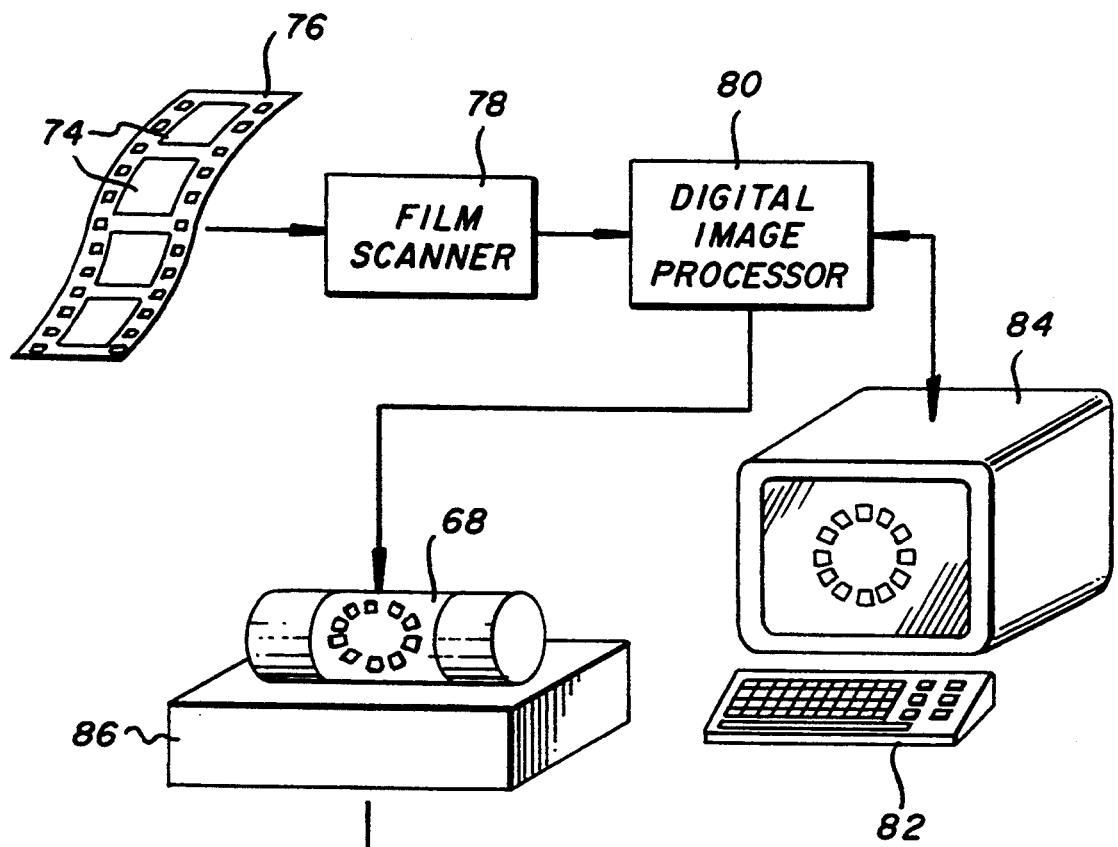
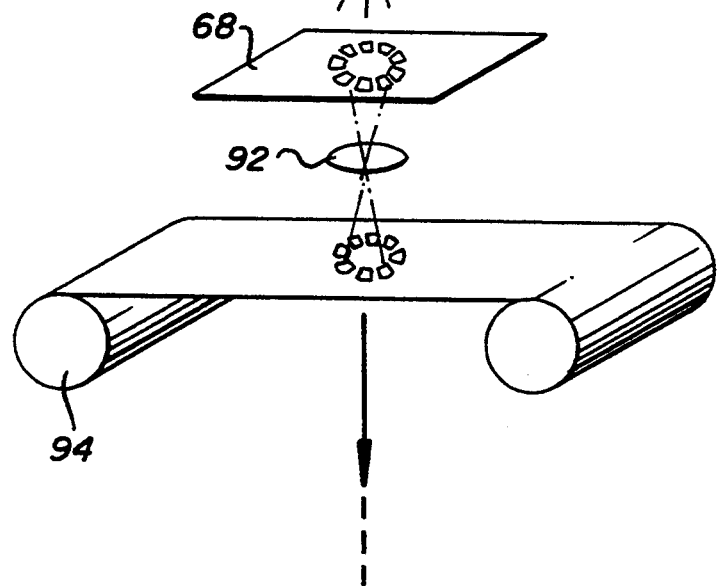
FIG. 4A
FIG. 4
| FIG. 4A | FIG. 4B |

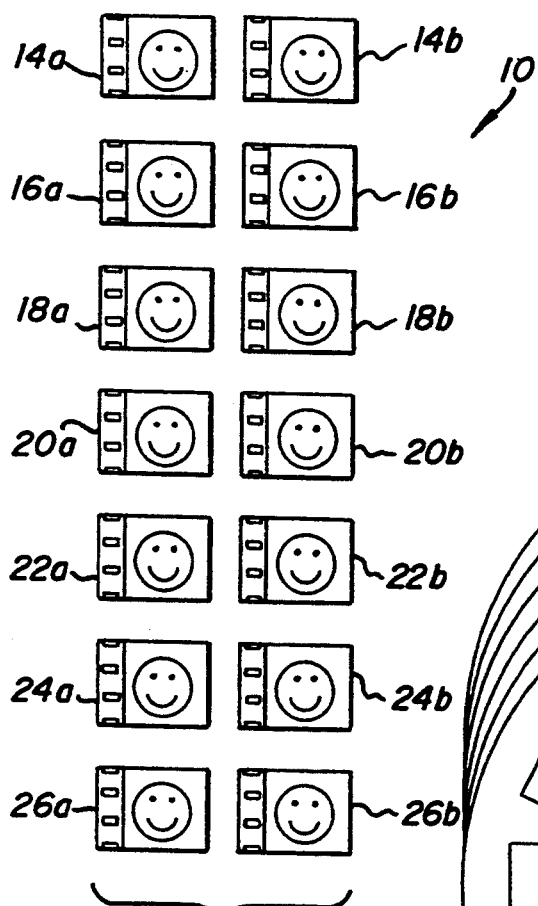
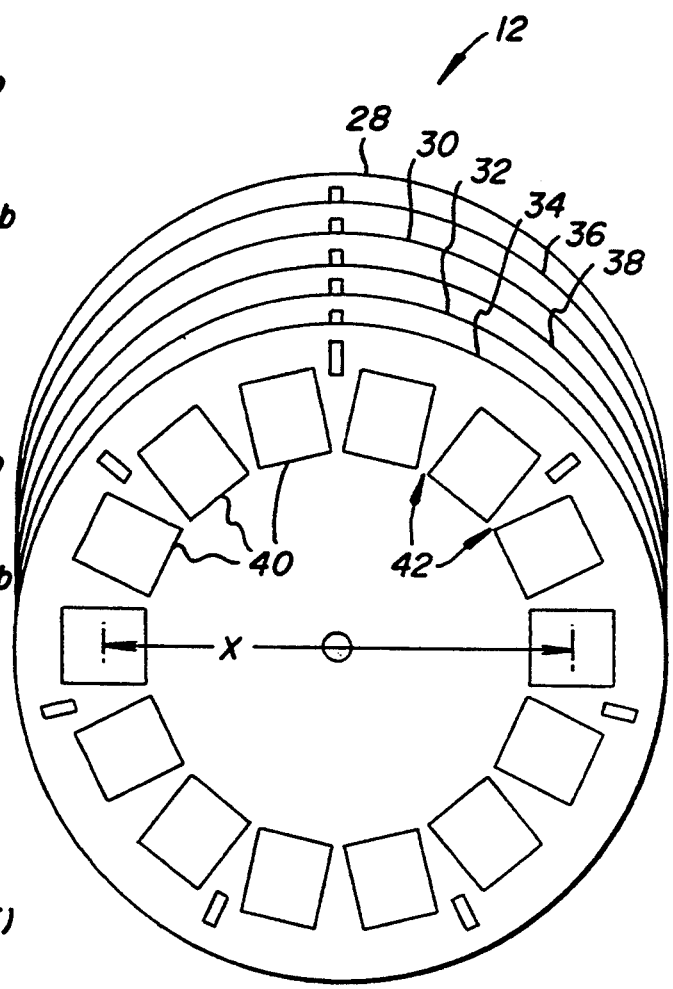
FIG. 5 (PRIOR ART)
FIG. 6 (PRIOR ART)
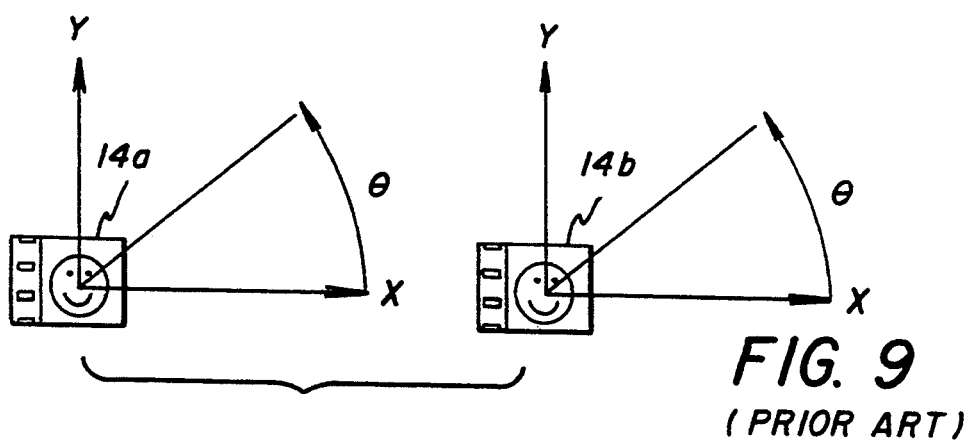
FIG. 9 (PRIOR ART)

STEREOSCOPIC DISK AND VIEWER AND METHOD OF MAKING

FIELD OF THE INVENTION

The present invention relates to a stereoscopic disk of the type having a plurality of stereo image pairs arranged around the periphery of the disk, the images of the pairs being arranged diametrically opposite each other on the disk, and a method of making such a stereoscopic disk and a viewer employing such a stereoscopic disk.

BACKGROUND OF THE INVENTION

In a well known system of stereoscopic imaging, transparent stereo image pairs are arranged around the periphery of a disk. The stereo images are viewed by inserting the disk in a binocular viewer. Successive image pairs are viewed by rotating the disk in the viewer, for example, by actuating a lever that engages the disk and rotates the disk by two image widths. Such a stereoscopic imaging system is widely available and sold under the trademark View ®-Master. FIGS. 5–8 illustrate the construction of the conventional View ®-Master disk. As shown in FIG. 5, the conventional View ®-Master disk includes 14 film chips generally designated 10 and as shown in FIG. 6 a disk formed from six layers of laminated paper and foil 12. The film chips 10 representing 7 stereo image pairs 14a, b–26a, b are made from images exposed and developed on 16 mm movie film, and then cut into chips. The paper and foil disk 12 includes four layers of paper 28, 30, 32, and 34, and two layers of foil 36, 38. The paper and foil is prelaminated into two units of paper-foil-paper prior to assembly of the disk. Windows 40 are cut in the paper and foil for mounting the stereo pairs. FIG. 7 shows how the film chips are mounted in the paper and foil laminated disk 12. FIG. 8 is an exploded cross sectional view of a completed View ®-Master disk taken along line 8—8 in FIG. 7 showing how the film chips 14a, b are mounted in the windows 40 that are cut in the laminated disk. Referring back to FIG. 6, one of the weak points of the conventional View ®-Master disk is the thin web of material 42 between the interior corners of the windows 40 in the laminated disk 12. Because this web of material 42 needs to be at least greater than some minimum dimension, the size of the stereo image for a given number of images, e.g. 14 images separated by a given stereo separation x, e.g. 65 mm is limited to some maximum dimension, e.g. 10.5×11.7 mm. Although a 65 mm separation between the images in a stereo pair is comfortable for the average adult, a separation of 55 mm to 58 mm is more appropriate for a child under the age of 10. Unfortunately, if the separation is reduced from 65 mm to 55 mm, the webs 42 become so thin that the disk becomes too fragile for normal use. If the size of the images are reduced, resolution is sacrificed, higher magnification is required, and accommodation to different interpupillary distances is reduced. FIG. 9 illustrates the three degrees of freedom X, Y and θ in which each of the film chips 14a and b must be precisely located. It will be appreciated from the foregoing description that the apparatus for assembling the stereo image disk must be quite complex with many moving parts. It is an object of the present invention to provide an improved construction for a stereo image disk that avoids the problems noted above. It would be desirable to be able to produce large quantities in a short time (e.g. 10 million per month) of the stereoscopic disks, for example for the advertising, toy and souvenir markets. Unfortunately, the cost of the assembly equipment is prohibitive for producing one time large batches of the elements. It is a further object of the present invention to provide a method for rapidly making large volumes of such disks.

SUMMARY OF THE INVENTION

The object is achieved according to the present invention by providing a stereoscopic disk including a disk of photographic film bearing a plurality of stereoscopic image pairs arranged around the circumference of the disk. The disk may be sandwiched between a pair of disks of opaque material defining a plurality of windows around the periphery of the opaque disks, the disks of opaque material being bonded to the disk of photographic film with the stereoscopic images located in the windows. The stereoscopic disk according to the present invention has the advantage of being more rugged than the prior art stereoscopic disks since the thin webs of material between the inside corners of the film chips that are required in the prior art stereoscopic disks to provide physical strength to the disks are not required. In the disk according to the present invention, the disk of film material provides the physical strength and the webs of material in the opaque disks between the inside corners of the film images do not provide structural support. The stereoscopic disk according to the present invention has the further advantage that a child size disk having the separation of only 55 mm to 58 mm between stereo pairs can be constructed without decreasing the standard 10.5×11.7 mm size of the images. Alternatively, in the adult sized disk having a spacing of 65 mm between images of a stereoscopic pair, the window size may be increased by approximately 20% in each direction thereby increasing the resolution of the image and allowing a reduction in magnification of the image which results in improved accommodation of different interpupillary distances. The stereoscopic disk according to the present invention has the further advantage of being much simpler to make than the prior art disk and therefore susceptible to rapid production in large batches.

According to another aspect of the present invention, a stereoscopic disk is made by the steps of: providing a master stereoscopic image comprising a plurality of stereoscopic image pairs arranged in a circle; printing the master stereoscopic image onto a strip of photographic transparency film in a photographic printer; developing the stereoscopic image in the photographic transparency material; and punching a disk containing the print of the stereoscopic image out of the transparency material. This method has the advantage of being simpler and more cost effective than the prior art method of making the stereoscopic disk. It has the further advantage that photographic processing apparatus capable of processing enormous quantities of the transparency film is readily available, thereby avoiding the need for building special processing facilities for large production quantities of the stereoscopic disks.

According to a further aspect of the present invention, a simple stereoscopic device is provided having a film disk with stereoscopic images arranged around the periphery of the disc, a retainer for holding the film disc, and a binocular viewer mated to the retainer for rotatably locating successive stereo image pairs on the disc in the field of view of the binocular viewer. The regions of the film disc around the stereoscopic images may be exposed to maximum density.

BRIEF DESCRIPTION OF THE DRAWINGS

FIG. 5 is a schematic diagram showing the seven stereo pairs of film chips that are employed in a prior art View ®-Master stereoscopic disk;

FIG. 6 is an exploded diagram showing the six laminations of foil and paper employed in the prior art View ®-Master stereoscopic disk;

FIG. 9 is a schematic diagram illustrating the alignment of the film chips in the prior art View ®-Master stereoscopic disk;

DETAILED DESCRIPTION OF THE INVENTION

Figure 1:
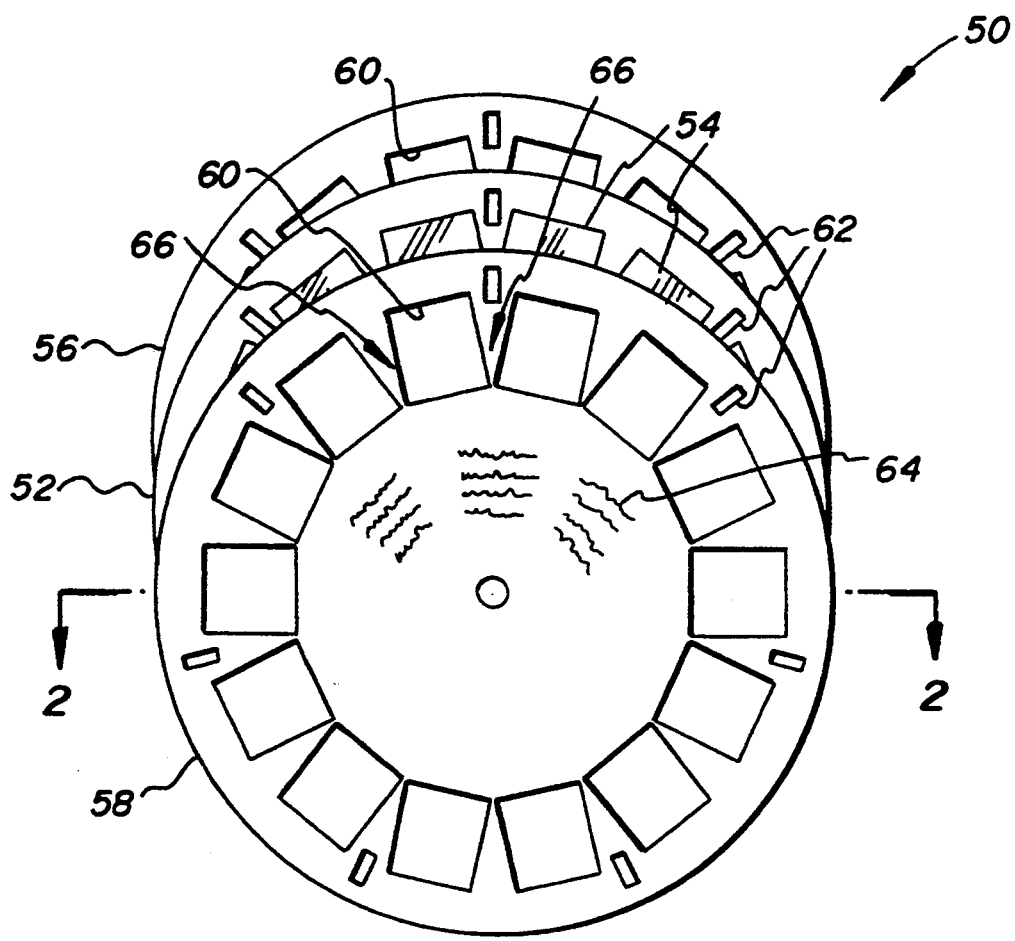
FIG. 1 is an exploded perspective diagram showing a stereoscopic disk according to the present invention.

Referring now to FIG. 1, an exploded view of a stereoscopic disk 50 according to one embodiment of the present invention is shown. The stereoscopic disk 50 includes a disk 52 of photographic film having a plurality of stereo image pairs 54 arranged around the periphery of the disk in the pattern well known in the art. The film disk 52 is sandwiched between two opaque disks 56 and 58 having windows 60 in which the stereo images 54 are positioned. The opaque disks 56 and 58 are preferably adhesive backed paper but may be formed from an opaque plastic sheet. The film disks 52 and the opaque disks 56 and 58 are laminated together to form the stereoscopic disk which closely resembles the prior art View ®-Master disk but as can be appreciated, is of much simpler construction. The series of detent slots 62 are arranged around the periphery of the disk for locating and rotating the disk in a viewer as is well known in the art. Titles 64 may be provided on the central region of the opaque disk 58 describing the scenes on the disk, as is well known in the art.

Figure 2:
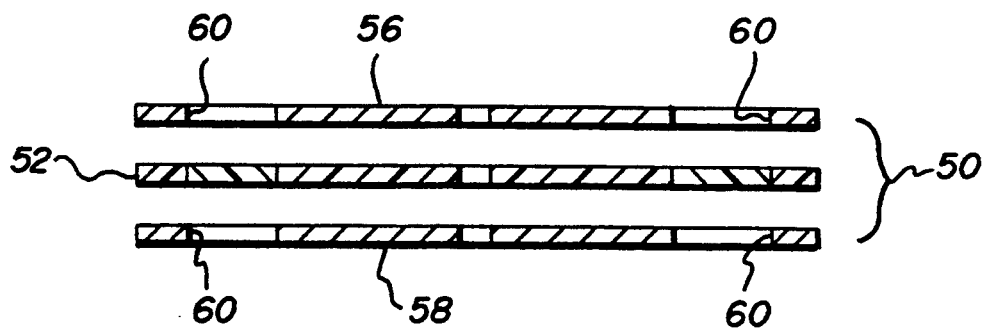
FIG. 2 is a cross sectional view of the disk shown in FIG. 1 taken along lines 2—2.
Figure 3:
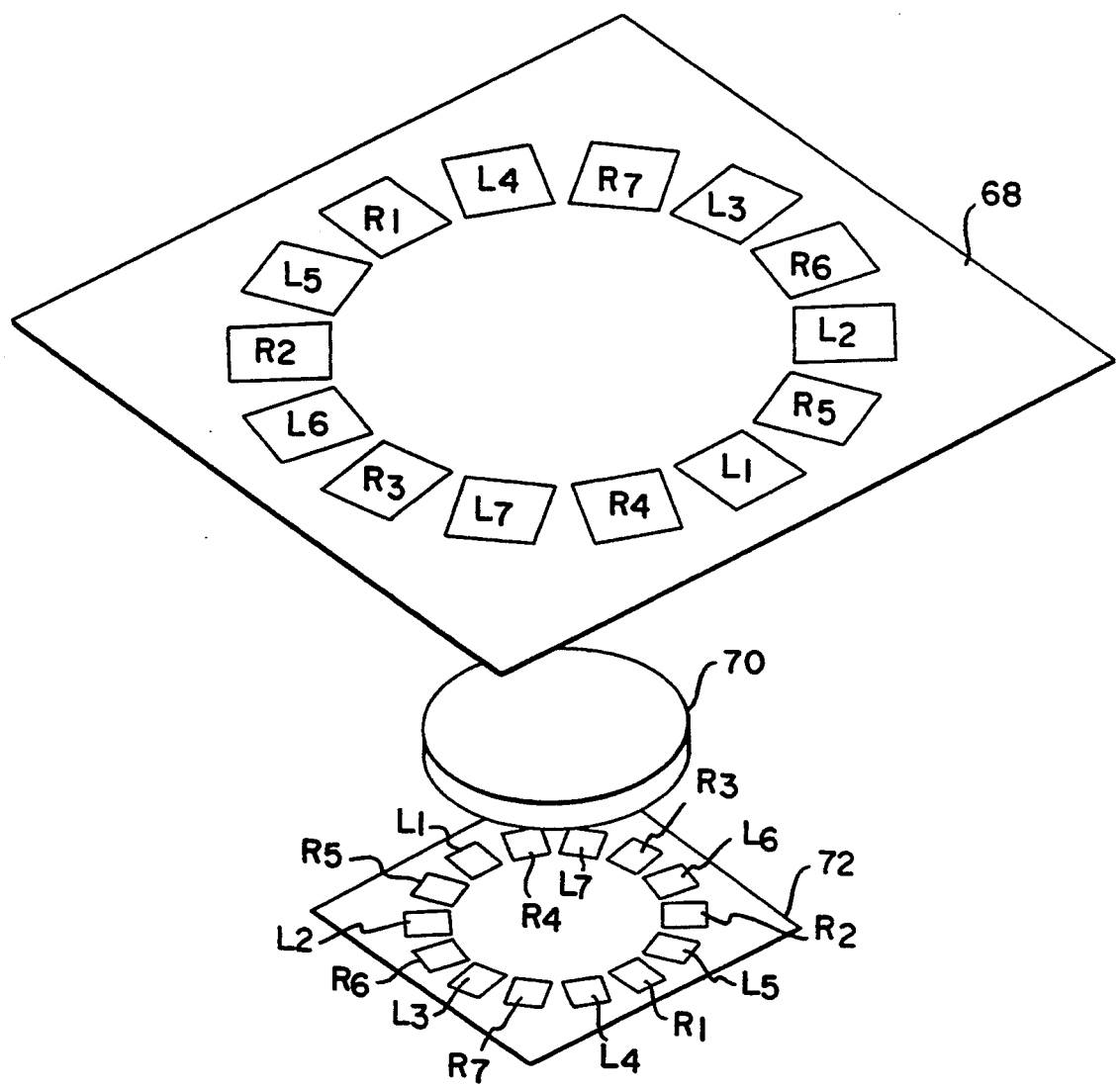
FIG. 3 is a schematic diagram illustrating a photographic reproduction of a stereoscopic disk according to the present invention.

FIG. 2 shows a cross section of the stereoscopic disk 50 taken along lines 2—2 in FIG. 1. Since the webs 66 of material in the opaque disk between the inside corners of the windows 60 are not required for physical integrity of the completed disk 50, they may be as narrow as desired to the point of touching at the corners of the windows, thereby allowing the images 54 of the stereoscopic disk 50 to be up to 20% larger in both the horizontal and vertical dimensions than the standard size View ®-Master disk with a spacing of 65 mm between images in a stereo pair. Furthermore, since the webs 66 are not needed for mechanical strength of the disk 50, a small "child sized" disk having a spacing of 55-58 mm may be constructed having the same number and size of images as the standard size View ®-Master disk, thereby preserving the resolution of the images. One way of making the film disk 54 is shown in FIG. 3. In this method, a master scene 68 is prepared on a color negative film such as Eastman Color Negative, Vericolor, or Kodacolor brand film manufactured by the Eastman Kodak Company, Rochester New York. The left and right images in the stereo pairs are indicated as $L_n$, $R_n$ respectively, and are arranged in a circle in the master scene 68. This master scene may be made for example by manually laying up a group of stereoscopic images, and photographing them in a process camera. If the stereoscopic images are transparencies, they may be placed in a mechanical holder, and used directly in a printer. Alternatively, the master scene may be generated digitally by scanning stereo pairs and producing the master scene on a graphic arts terminal. The master scene 68 is printed on a photographic printer (represented simply by lens 70) onto a transparency film 72 such as Eastman Color Print, Vericolor Print or Dura Clear Trans film manufactured by the Eastman Kodak Company. This method is appropriate where very large numbers of identical stereoscopic disks are to be prepared.

Figure 4B:
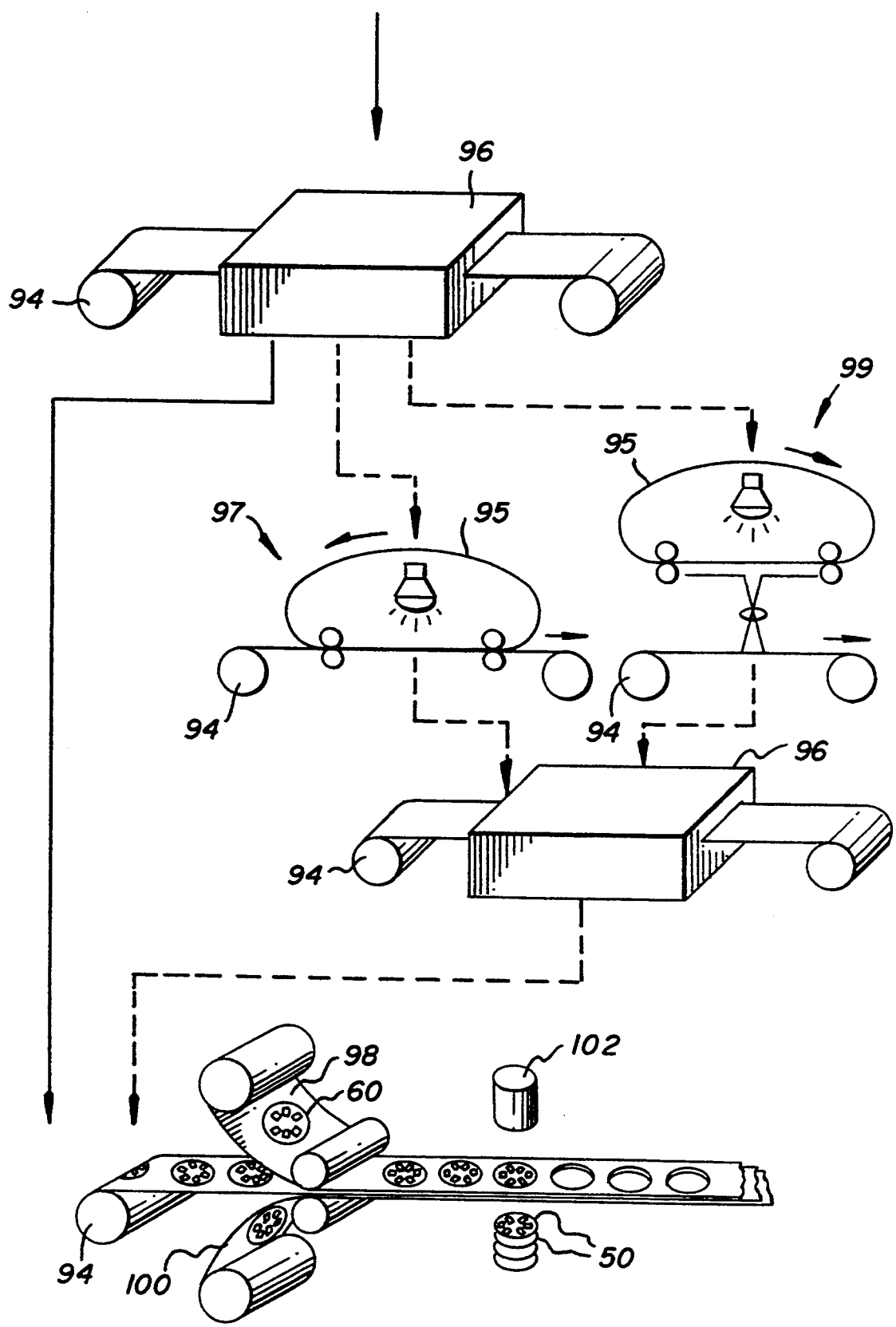
FIG. 4 is a schematic diagram illustrating a method of making the stereoscopic disk according to the present invention.
Figure 7:
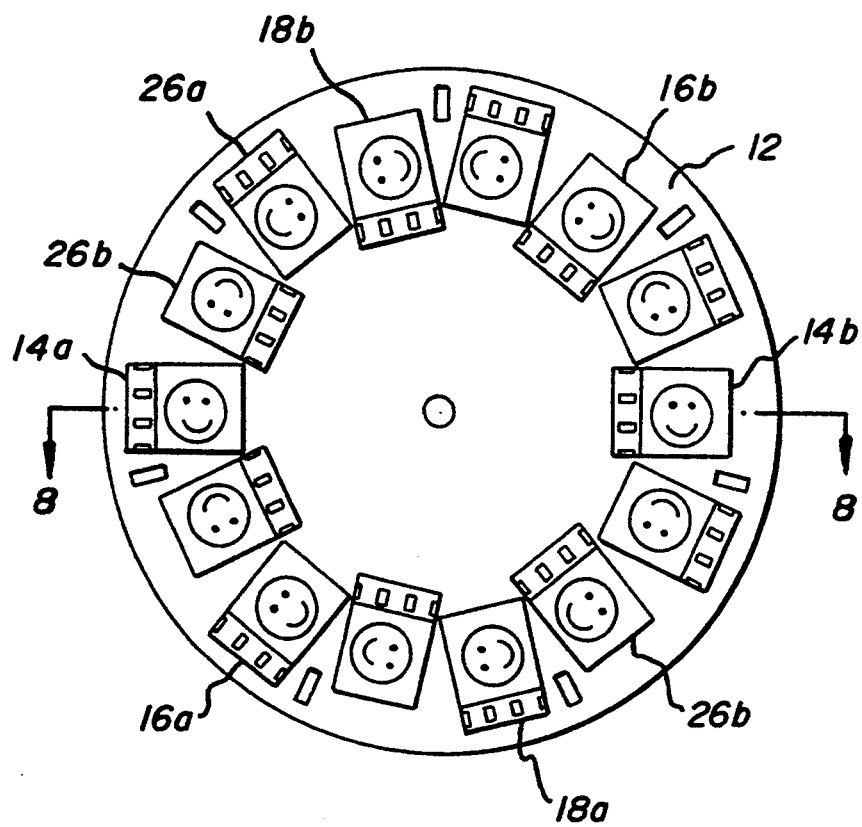
FIG. 7 is a schematic diagram showing how the film chips of FIG. 4 are arranged in the View ®-Master stereoscopic disk.
Figure 8:
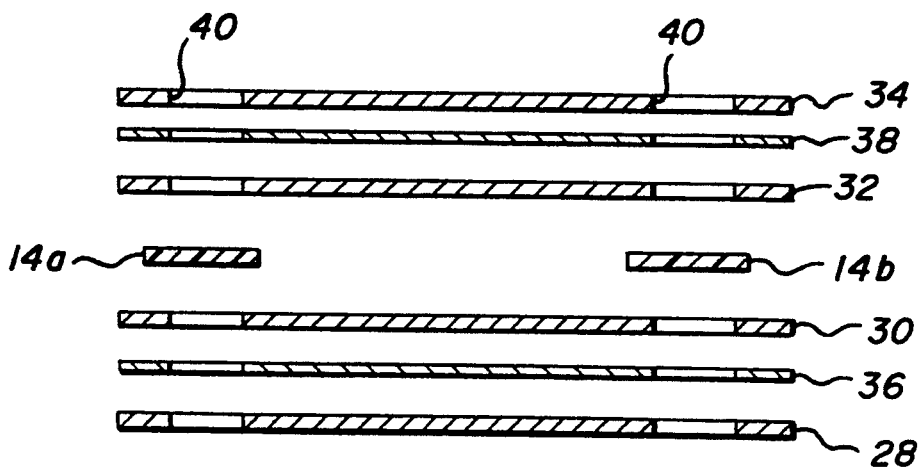
FIG. 8 is a cross sectional view of a prior art View ®-Master disk taken along lines 7—7 in FIG. 6.

FIG. 4 illustrates one example of how the stereoscopic disk 50 of the present invention may be produced. First, a series of stereoscopic images 74 produced on a photographic film strip 76 in a conventional manner are scanned in a digital film scanner 78 such as a Perkin Elmer PDS Microdensitometer or an Eikonix Model 1435 high resolution scanner, to produce digital stereo image pairs. Alternatively, the images may be produced from a "Photo CD" service available through photo dealers. The digital stereo images are stored in the memory of a digital image processing computer 80 and are arranged by an operator working with a keyboard 82 and CRT 84 in the desired pattern for the master scene. Many well known graphic arts computer and software packages, such as the PHOTOSHOP software package manufactured by Adobe, are capable of providing the needed tools for manipulating the digital images. In addition, further processing steps may be performed in the digital image processor, such as edge enhancement of the digital image and compensation for any distortion that may occur in the printing step.

Once the desired digital image processing has taken place, the master scene is printed out on an output film scanner 86 such a MacDonald-Detweiler Associates Fire 1000 film recorder, onto a transparency film. The master scene 68 is then printed a number of times in a photographic printer 88 shown schematically as a light source 90 and printing lens 92 onto a roll 94 of positive transparency film. A conventional step and repeat type printer is capable of producing about 4 frames per second. An order of magnitude higher printing speed can be achieved as illustrated by dotted lines in FIG. 4 by preparing a second generation master loop 95 containing several identical copies of the master scene arranged around a loop of transparency film. The master loop 95 is then repeatedly copied onto a strip of film in either a contact printer 97 or a non-contact printer 99 of the type employed for reproducing motion picture films. The exposed roll of film 94 is developed in a film processor 96. The developed roll of transparency film 94 is then laminated between strips of opaque material 98, 100 having the circular pattern of windows 60 pre-punched. Finally, the completed stereoscopic disks 50 are punched from the laminated strips by a circular punch 102.

The resulting stereoscopic disks 50 in the standard 65 mm spacing size can be used in any existing View®-Master viewer. Non standard disks will require special viewers.

Figure 10:
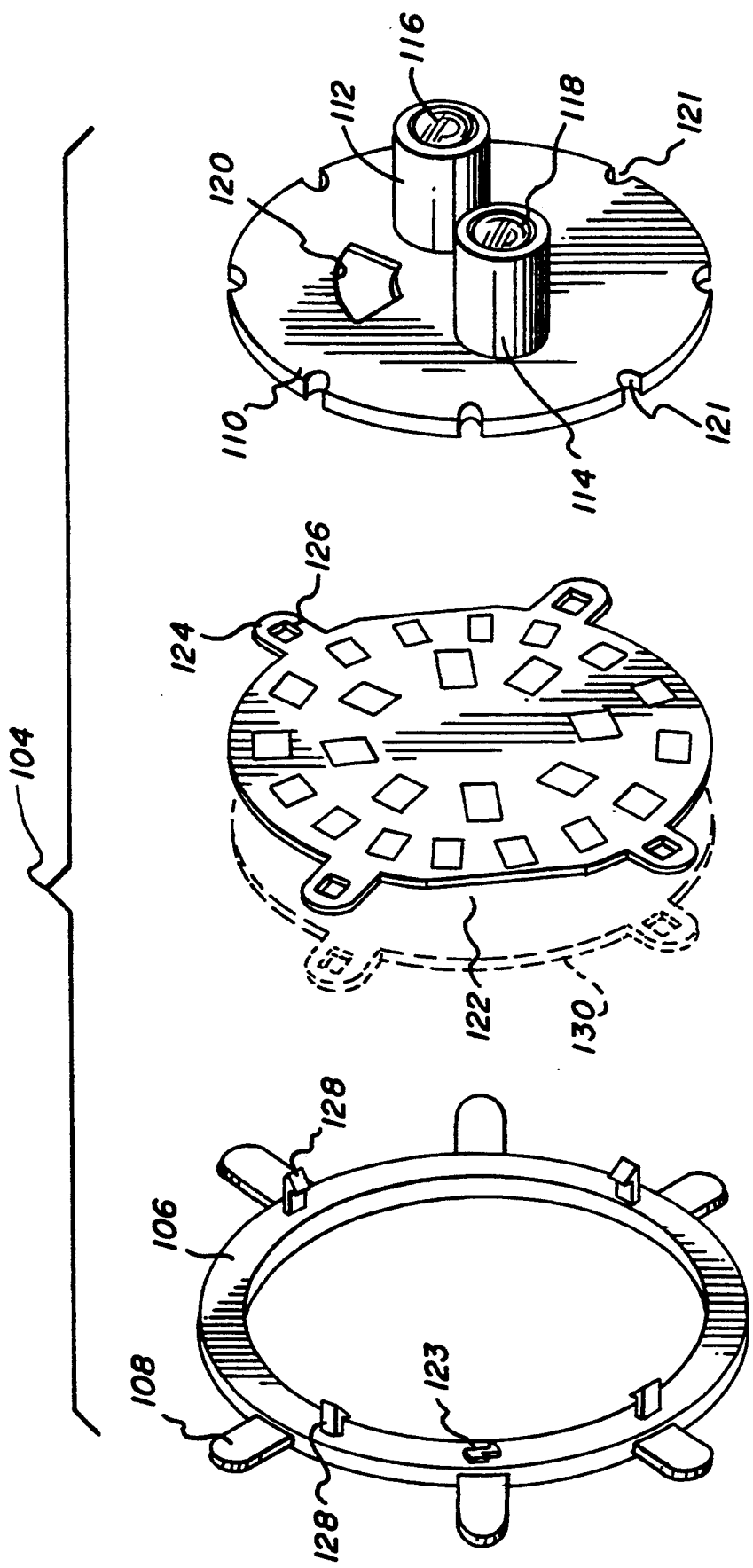
FIG. 10 is an exploded perspective view of a simple stereoscopic viewer according to the present invention.

Because the process of the present invention lends itself to the economic production of large numbers of stereo disks, the possibility arises for producing an inexpensive stereo viewer suitable as a premium for advertising or the like. In such a viewer, the film disk would not be removable and therefore it would not need the extra stiffness and ruggedness provided by the opaque outer disks 56 and 58. In such a viewer, the areas between the stereo images on the film disk can be exposed to maximum density, and captions can be provided for the stereo views by printing the characters describing the views as transparent characters in the maximum density region in the central portion of the disk. FIG. 10 is an exploded perspective view of one example of such a simple stereoscopic viewer 104. The viewer comprises a film retaining ring 106 that can be manually rotated by means of finger levers 108 with respect to a binocular viewer body 110. The binocular viewer body 110 includes a pair of lens barrels 112 and 114 which contain simple lenses 116 and 118, respectively. The binocular viewer body 110 defines a window 120, through which a caption describing the scene in the viewer can be observed. The viewer body 110 may be provided with detents 121 which cooperate with a pawl 123 on the retaining ring 106 to accurately locate the stereoscopic images in the viewer. The film disc 122 is provided with tabs 124 having holes 126 that fit over posts 128 on retaining ring 106. A diffuser element (shown in phantom) 130 formed for example by stamping from a sheet of translucent plastic, can be provided adjacent the film disc 122, and is located and held over the posts 128 in the same manner as the film disc 122. Alternatively, the film disc itself may be provided with a diffuse surface on the side away from the viewing lenses 116,118.

Figure 11:
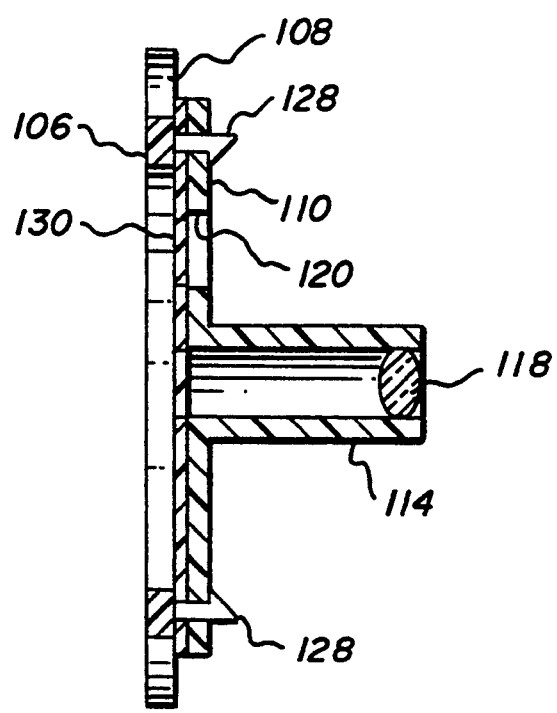
FIG. 11 is a cross sectional view of the stereoscopic viewer in FIG. 10 taken along lines 11—11.

FIG. 11 is a cross sectional view of the stereoscopic viewer. As shown in FIG. 11, posts 128 are provided with retaining latches that snap over the edge of the viewer body 110 to hold the retaining ring to the viewer body and to retain the film disc 122 (and optionally the diffuser 130 between the retaining ring and the viewer body.

Preferably, the viewer body 110, lens barrels 112,114 and lenses 116,118 are injection molded as a single unit from clear plastic. The inside of lens barrels 112,114 may be painted, or paper tubes inserted in them to prevent stray light from entering the lens barrels. Alternatively, the viewer body may be injection molded from opaque plastic and lenses 116 and 118 mounted in the lens barrels.

Figure 12:
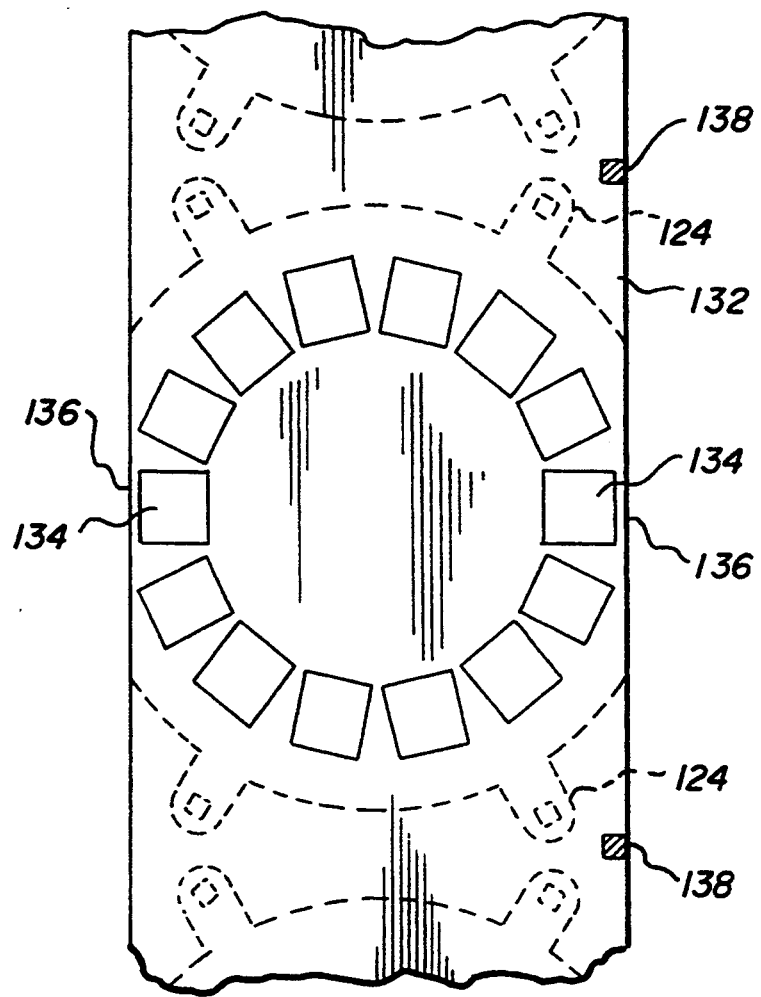
FIG. 12 is a schematic diagram illustrating the layout of a film disc on 70 mm width film.

The stereoscopic viewer 104 may be designed for children with a spacing between images in a stereo pair of 55–58 mm. Preferably seven pairs of 10.5×11.7 mm images are provided on the periphery of the film disk 122. With this spacing, the disk can be produced from unperforated 70 mm wide film as shown in FIG. 12. This is advantageous in that 70 mm is a standard width for film. As illustrated in FIG. 12, one pair of stereo images 132 is placed very near the edge of the film strip 134 such that the film disk that is punched from the 70 mm film strip has 2 flat spots 136 near these images. The outline of the punch used to produce the film disc is shown by dotted lines, illustrating the location of the tabs 124 on the film disk. Registration marks 138 may be provided in the printer and later sensed at the punching step to aid in the accurate location of the film strip 132 in the punch. cl PARTS LIST 10 film chips
12 paper & foil laminated disk
14a,b stereo pair of film chips
16a,b stereo pair of film chips
18a,b stereo pair of film chips
20a,b stereo pair of film chips
22a,b stereo pair of film chips
24a,b stereo pair of film chips
26a,b stereo pair of film chips
28 layer of paper
30 layer of paper
32 layer of paper
34 layer of paper
36 layer of foil
38 layer of foil
40 windows
42 webs
50 stereoscopic disk
52 photographic film disk
54 stereo image pairs
56 opaque disk
58 opaque disk
60 windows
62 detent slots
64 titles
66 webs
68 master disk
70 lens
72 transparency film
74 stereoscopic images
76 photographic film strip
78 digital film scanner
80 digital image processing computer
82 keyboard
84 CRT
86 output film scanner
88 photographic printer
90 light source
92 printing lens
94 film
95 film loop
96 film processor
97 contact printer
98 opaque material
99 non-contact printer
100 opaque material
102 circular punch
104 simple stereoscopic viewer
106 film retainer ring
108 finger levers
110 binocular viewer housing
112 lens barrel
114 lens barrel
116 simple lens
118 simple lens
120 window
121 ridges
122 film disk
123 pawl
124 tabs
126 holes 128 posts
130 diffuser disk
132 pair of stereo images
134 film strip
136 flat spots on film strip
138 registration mark

We claim:

1. A stereoscopic disk, comprising:
   a. a disk of photographic film bearing a plurality of stereoscopic image pairs arranged around the circumference of the disk; and
   b. first and second disks of opaque material defining a plurality of windows around the periphery of said opaque disks, said disks of photographic film being laminated between said first and second disks of opaque material with said image pairs located in said windows.

2. The stereoscopic disk claimed in claim 1, wherein said opaque material is paper.

3. The stereoscopic disk claimed in claim 1, wherein the stereo pairs are spaced diametrically apart by between 55–58 mm.

4. The stereoscopic disk claimed in claim 3, having seven pairs of images of 10.5×11.7 mm.

5. A method of making a stereoscopic disk, comprising the steps of:
   a. providing a master stereoscopic image including a plurality of stereoscopic image pairs arranged in a circle;
   b. printing the master stereoscopic image onto a strip of photographic film in a photographic printer;
   c. developing the stereoscopic image in the photographic film; and
   d. forming a disk containing the print of the stereoscopic images out of the photographic film.

6. The method claimed in claim 5, wherein said step of printing the master stereoscopic image further comprises the steps of:
   a. preparing a second generation master loop of film bearing a plurality of images of said master stereoscopic image, and
   b. printing said secondary master image onto said strip of photographic film while simultaneously advancing said strip of photographic film and circulating said second generation master loop.

7. A stereoscopic disc made according to the method of claim 5 or 6.

8. The method claimed in claim 5 or 6 further comprising the step of laminating the photographic transparency material between a pair of disks of opaque material defining windows around the periphery of the disks, with the stereo images located in said windows.

9. The method claimed in claim 5 or 6 wherein said step of providing a master stereoscopic image, further comprises the steps of:
   a. recording a plurality of stereo image pairs on a photographic film;
   b. scanning the stereo image pairs in a film scanner to produce digital images;
   c. manipulating the digital images to compensate for subsequent printer distortion and to arrange the digital images in a circle; and
   d. generating the master stereoscopic image on a digital film writer.

10. The method claimed in claim 5 or 6, wherein said step of providing a master stereoscopic image comprises the steps of:
    a. generating a plurality of digital stereo image pairs;
    b. manipulating the digital stereo image pairs in a digital image processing computer; and
    c. generating the master stereoscopic image on a digital film writer.

11. A stereoscopic device, comprising:
    a. a film disk having a plurality of stereo image pairs arranged around the periphery of the film disk;
    b. a retainer for holding the film disk; and
    c. a binocular viewer mated to the retainer for rotatably locating successive stereo image pairs on said disk in a field of view of said binocular viewer.

12. The stereoscopic device claimed in claim 11, further comprising a detent cooperating with the retainer and the binocular viewer for locating stereo image pairs in said field of view.

13. The stereoscopic device claimed in claim 11, wherein said film disk further includes a plurality of titles describing said stereo image pairs located on an inner portion of said disk, and wherein said binocular viewer defines a window for viewing a title associated with a stereo image pair in said viewer.

14. The stereoscopic device claimed in claim 11, wherein seven of said stereo image pairs are arranged on said disk and spaced diametrically apart by between 55 and 58 mm.

15. The stereoscopic device claimed in claim 14, wherein said stereo image pairs are 10.5×11.7 mm in size.

16. The stereoscopic device claimed in claim 12, further comprising a diffuser disk located adjacent said film disk.

17. The stereoscopic device claimed in claim 12, wherein said film disk has a light diffusing surface.

18. The stereoscopic device claimed in claim 12, wherein regions of said film disk between images are exposed to maximum density.

* * * * *